United States Patent
Zhang (10) Patent No.: US 9,864,428 B2
(45) Date of Patent: Jan. 9, 2018

(54) HUMAN COMPUTER INTERACTION USING WEARABLE DEVICE

(71) Applicant: Verizon Patent and Licensing Inc., Basking Ridge, NJ (US)

(72) Inventor: Guangli Zhang, Shanghai (CN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/785,425

(22) PCT Filed: Jun. 28, 2013

(86) PCT No.: PCT/CN2013/078330
§ 371 (c)(1),
(2) Date: Oct. 19, 2015

(87) PCT Pub. No.: WO2014/205767
PCT Pub. Date: Dec. 31, 2014

(65) Prior Publication Data
US 2016/0070341 A1    Mar. 10, 2016

(51) Int. Cl.
*G06F 3/048* (2013.01)
*G06F 3/01* (2006.01)
*G06F 1/16* (2006.01)

(52) U.S. Cl.
CPC .............. *G06F 3/011* (2013.01); *G06F 1/163* (2013.01); *G06F 1/1694* (2013.01); *G06F 3/014* (2013.01);
(Continued)

(58) Field of Classification Search
CPC ............. G06F 17/242; G06F 17/30864; G06F 2203/04808; G06F 3/0416; G06F 3/04883; G06F 21/316; G06F 21/552; G06F 3/014; G06F 3/017; G06F 3/038; G06F 1/1637; G06F 1/3215; G06F 21/44; G06F 2221/2111; G06F 3/0482; G06F 3/0488; G06F 3/04812; G06F 3/04842; G06F 3/04886; G06F 3/0346; G06F 2200/1637; G06F 1/163; G06F 2203/0338
(Continued)

(56) References Cited

U.S. PATENT DOCUMENTS 7,280,096 B2 * 10/2007 Marvit ................. G06F 1/1613
345/156
8,296,151 B2   10/2012 Klein et al.
(Continued)

FOREIGN PATENT DOCUMENTS

CN     101593018 A    12/2009
CN     102306051 A    1/2012
(Continued)

*Primary Examiner* — Duc Dinh (57) ABSTRACT

Embodiments of apparatus and methods for human-computer interaction are described. An apparatus for human-computer interaction may have one or more processors, multiple sensors to measure motion of a body part of a user, a communication module to communicate with a remote computing device, and an interpretation module to interpret the motion of the body part of the user to be associated with an indication of a user input to the remote computing device. The components may be encased in a body configured to be worn by the user. Other embodiments may be described and/or claimed.

20 Claims, 7 Drawing Sheets

(52) U.S. Cl.
CPC ...... *G06F 3/017* (2013.01); *G06F 2200/1637* (2013.01)

(58) Field of Classification Search
USPC .................. 345/169, 173, 174, 175, 156
See application file for complete search history.

(56) References Cited

U.S. PATENT DOCUMENTS

| | | |
|---|---|---|
| 8,564,535 B2 | 10/2013 | Ullrich et al. |
| 8,570,273 B1* | 10/2013 | Smith ............... G06F 3/0338 345/156 |
| 2004/0090423 A1* | 5/2004 | Bisset ............... G06F 3/0346 345/169 |
| 2010/0304868 A1* | 12/2010 | Zalewski ............ A63F 13/06 463/38 |
| 2013/0238712 A1* | 9/2013 | Dearman ............ H04L 67/145 709/205 |

FOREIGN PATENT DOCUMENTS

| | | |
|---|---|---|
| CN | 102446025 A | 5/2012 |
| WO | WO 2011/092549 A1 | 8/2011 |

\* cited by examiner

HUMAN COMPUTER INTERACTION USING WEARABLE DEVICE

FIELD OF THE INVENTION

The present disclosure relates generally to the field of data processing, and more particularly, methods and wearable apparatuses for human-computer interaction.

BACKGROUND

A contemporary electronics device may often be equipped with a remote control which may be used to operate the electronics device wirelessly from a short distance. In a home, for example, a television set, a DVD player, and a home theater system may be operated by their respective remote controls. Meanwhile, universal remote controls have also become popular to manage multiple devices due to the proliferation of remote controls. Most of these remote controls communicate via infrared signals to their respective controllable devices; common commands issued by remote controls may include switching channels and adjusting volume.

Remote control has continually advanced along with modem technologies and evolved into a rather powerful computing device. For example, with the emergence of smart TVs which integrate Internet and Web features into television sets or set-top boxes, the sophistication of the interaction between a user and a smart TV may continue to challenge the capabilities of remote controls. As an example, it may be inconvenient to use a traditional remote control to input text or control a web interface. As another example, a remote control with comprehensive keys or a full QWERTY keyboard may be cumbersome to learn and use for ordinary users. In short, traditional remote controls may become a bottleneck for human-computer interaction and introduce unsatisfactory user experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of apparatus and methods for human-computer interaction are described herein. In embodiments, a wearable device for human-computer interaction, e.g., interaction with a content consumption device, may have one or more processors, multiple sensors to measure motions of a user, a transceiver to communicate with a content consumption device, and logic configured to be operated by the one or more processors to interpret the motion of a body part of a user as an indication of a user input for an application of the content consumption device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
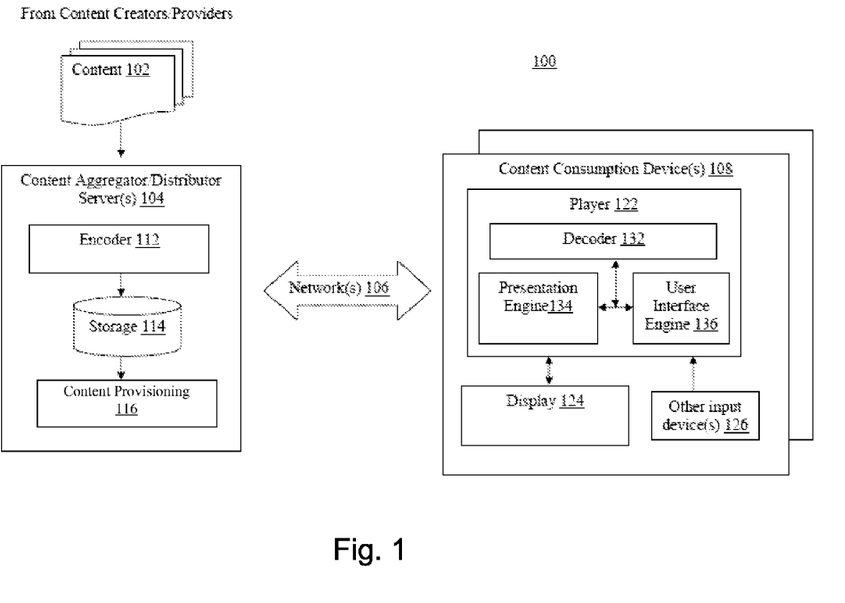
FIG. 1 illustrates an example arrangement for content distribution and consumption incorporating aspects of the present disclosure, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106. In embodiments, a user of a content consumption device 108 may interact with the content consumption device 108 using a wearable computing device, e.g., as one of other input devices 126. These and other aspects will be described more fully below.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube® video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H.264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, content provisioning 116 may include a transpackager, which may be configured to package content files encoded by the encoder 112 in one or more output packaging formats for subsequent provisioning.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which content consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126. In embodiments, as described earlier, user input device 126 may include a wearable device incorporated with the teachings of this disclosure, e.g., wearable computing device 200 of FIG. 2, to facilitate a user to interact with content consumption device 108.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand-alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand-alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124, and user input device(s) 126 may be likewise integrated.

Figure 2:
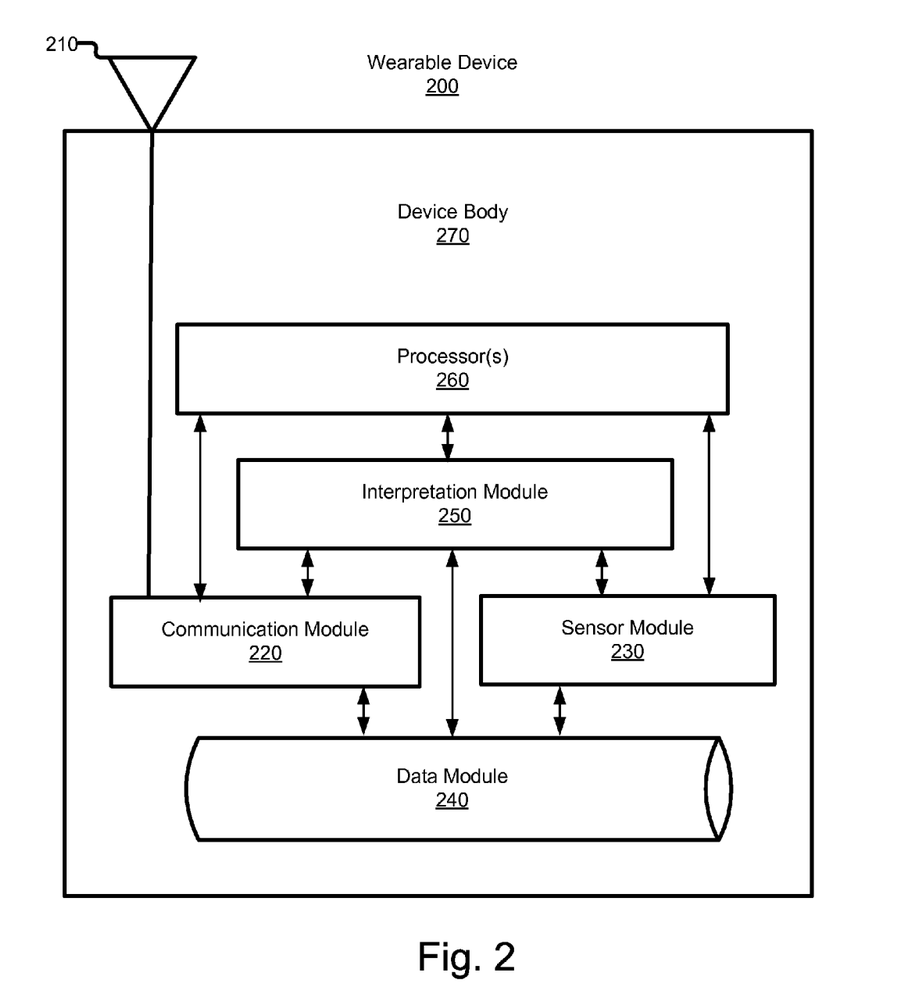
FIG. 2 is a block diagram illustrating an example wearable device incorporating aspects of the present disclosure, in accordance with various embodiments.

Referring now to FIG. 2, an example wearable device 200 for human-computer interaction is illustrated in further detail, in accordance with various embodiments. In embodiments, wearable device 200 may be a wearable computer. In embodiments, the wearable device may have a device body or form factor with shape, dimension, and materials configured for the device to be worn by a user. Wearable device 200 may have a form factor configured to be worn on a wrist, such as in the arrangement of a watch, or to be worn on other parts of a human body other than wrist, such as various clothing items for the arm, leg, neck, head, or other body locations. In embodiments, components of wearable device 200 may include processor 260, antenna 210, communication module 220, sensor module 230, data module 240, and interpretation module 250, selectively coupled with each other and encased in device body 270 or form factor with shape or dimensions (not shown), and constituted with suitable materials, configured to be worn by a user.

Wearable device 200 may include antenna 210 and one or more wireless transceivers (not illustrated). Antenna 210 may, in various embodiments, include one or more directional or omni-directional antennas such as dipole antennas, monopole antennas, patch antennas, loop antennas, microstrip antennas, and/or other types of antennas suitable for reception of radio frequency (RF) or other wireless communication signals. Although FIG. 2 depicts a single antenna, in various embodiments, wearable device 200 may include additional antennas.

Wearable device 200 may include infrared (IR) light-emitting diodes (LEDs) (not illustrated) to emit infrared radiation for IR communication; these IR LEDs may be included in addition to or instead of the antenna 210. In embodiments, IR radiation may be focused by a plastic lens into a modulated beam which may encode data for communication. In embodiments, wearable device 200 may include additional hardware for wireless communication. The underlying communication hardware, such as antenna 210, may be coupled to communication module 220.

In embodiments, communication module 220 may communicate with other computing devices via wired or wireless communication. Communication module 220 may include one or more transceivers, such as a line-of-sight wireless transmitter, an infrared transmitter, or a radio frequency transceiver. Communication module 220 may be configured to receive and transmit wireless signals from and to another remote computing device, and may extract information from wireless signals received from other wireless devices. In some embodiments, this information may include information about audio communication, such as streamed music or VoIP calling. In some embodiments, this information may include information about video communication, such as multimedia messaging or video on demand. In some embodiments, this information may include information about data communication, such as firmware updating for wearable device 200 or data for online shopping. In some embodiments, this information may include available actions in connection with the current state of an application running on a remote device, such as browsing options or selectable items within a user interface of an e-commerce application currently displayed on the remote device.

In some embodiments, such information may be wirelessly downloaded to data module 240. In some embodiments, such information may be retrieved directly from a remote device in communication with wearable device 200. In some embodiments, such information related to the remote device in direct communication with wearable device 200 may be retrieved from a remote server via the Internet. Data module 240 may include any suitable form of data structure to store data with any suitable physical data model, such as flat file or inverted index, or any suitable logical data model, such as relational or object model. Data module 240 may store data in either volatile or non-volatile memory, in local or remote locations.

In embodiments, such wireless communication may be event-driven. In some embodiments, wearable device 200 may initiate wireless communication, for example, upon detecting the motion of a body part of a user of an application running on a remote computing device. In some embodiments, an event in a remote device, e.g., content consumption device 108, in direct or indirect communication with wearable device 200 may actuate such wireless communication. As an example, an online game played via a smart TV embodiment of content consumption device 108 may request a player to select characters and weapons. As another example, in an embodiment where player 122 of content consumption device 108 also configured to support web surfing, an e-commerce website may prompt a shopper to input payment information, review the shopping cart, and complete a transaction.

In general, a remote device may start a wireless communication session with wearable device 200 based on the current state of the remote device, and may send wearable device 200 one or more indications of contemporary actions in connection with the current state of the remote device. For example, when a web surfer browses through a series of web pages via the remote device, such as a smart TV, the smart TV may send different available actions to the web surfer. For instance, multimedia control options may be sent if the web surfer is on a YouTube® page, while text composing options may be sent if the web surfer is on a Twitter® or Tumblr® page.

In embodiments, such wireless communication may occur periodically. For example, wearable device 200 may be configured to communicate with a remote device in predetermined time intervals. In embodiments, such wireless communication may be initiated manually by a user when, for example, the user presses a button or issues a voice command, subsequently causing wearable device 200 to communicate with a remote device.

In embodiments, communication module 220 may be configured to pass relevant information to interpretation module 250. In embodiments, interpretation module 250 may be configured to receive external information via communication module 220, but also internal information from sensor module 230.

Sensor module 230 may include one or more sensors to measure physical properties of wearable device 200 and/or its user, and then convert such physical properties into information which can be used by interpretation module 250. In embodiments, sensor module 230 may include motion detection sensors (not shown) and gesture detection sensors (not shown).

Motion information may include velocity, acceleration, and spatial or positional information of wearable device 200. In embodiments, among various motion detection sensors, sensor module 230 may use, for example, accelerometers to detect direction and speed of movement of wearable device 200, inclinometers to measure the tilt angle of wearable device 200 relative to the earth's ground plane, and rate sensors or gyroscopes to measure the angular velocity of wearable device 200. Recognizing that the foregoing examples were merely indicative of potential underlying sensors or technologies to detect motion information, in other embodiments, different sensors or technologies may also be used by sensor module 230 to detect motion.

In embodiments, sensor module 230 may utilize the motion information of motion detection sensors to selectively actuate other types of sensors and perform various sensor related operations, such as to start, stop or pause operations for some sensors, or to adjust sensitivity of other sensors. Interpretation module 250 may use motion information to determine whether wearable device 200 is in active use by a user. Moreover, interpretation module 250 may also associate motion information to body gestures of the user based on the body part where wearable device 200 may be worn or attached.

A gesture may be a form of non-verbal communication based on motion or state of a part of human body, such as the arms, hands, fingers, head, or other parts of the body. In embodiments, sensor module 230 may utilize gesture detection sensors to recognize or interpret gestures. In embodiments, gesture detection sensors may include optical sensors, and sensor module 230 may utilize the optical sensors and vision interpretation processes to interpret gestures, such as body or face gestures. In embodiments, gesture detection sensors may include the previously illustrated various motion detection sensors, and sensor module 230 may utilize the motion detection sensors and motion interpretation processes to interpret gestures, such as hand or arm gestures. In embodiments, gesture detection sensors may include piezoelectric sensors to measure the force of the tendon network of the fingers, and sensor module 230 may utilize the piezoelectric sensors to interpret finger positions or gestures.

In embodiments, sensor module 230 may be trained to recognize a set of personalized gestures from a particular user. Thus a user may use wearable device 200 to interact with remote devices naturally based on gesture-based communication without any mechanical devices such as mouse and keyboard. For example, a user may use finger gestures, e.g. contract or flex a finger, to scroll a web page. Wearable device 200 may surpass conventional input devices such as mouse, keyboards, or touch screens in facilitating more intuitive and convenient human-computer interactions. Some embodiments of gesture training are further illustrated in connection with FIG. 5.

In embodiments, interpretation module 250 may interpret information provided by sensor module 230 based on contextual information received from communication module 220. Contextual information may include available actions in connection with the current state of a remote device or an application running on the remote device as described above. In embodiments, one gesture may be interpreted differently based on the available actions associated with the remote device. For example, a finger gesture of flexing a thumb may be interpreted as "yes" to a confirmation request, but "channel up" to a channel selection prompt. Some embodiments of gesture interpretation are further illustrated in connection with FIG. 4.

In embodiments, wearable device 200 may incorporate other type of sensors for additional functionalities. As an example, with health monitoring sensors, e.g. blood pressure sensors, wearable device 200 may additionally monitor the health conditions of its users. As another example, with temperature detection sensors, wearable device 200 may additionally provide real-time ambient temperature to users. Yet as another example, with authentication or security sensors, e.g., fingerprint sensor, wearable device 200 may limit certain functions only to authorized persons, assist a user to obtain secured services, such as banking transactions, automatically load a user's preference, load a user's favorite channels, etc.

In various embodiments, wearable device 200 may include one or more implementations of the user input device(s) 126 described above. In various embodiments, wearable device 200 and the player 122 may be configured to communicate via one or more communication channels. For example, wearable device 200 may be configured to send commands to the player 122 to control the player 122. In some embodiments, the player 122 may likewise be able to send commands and/or information to wearable device 200, such as to affect one or more displays/feedback on wearable device 200. In various embodiments, wearable device 200 may be configured as one of the content consumption devices 108. In this case, wearable device 200 may be configured to control its own content consumption.

Figure 3:
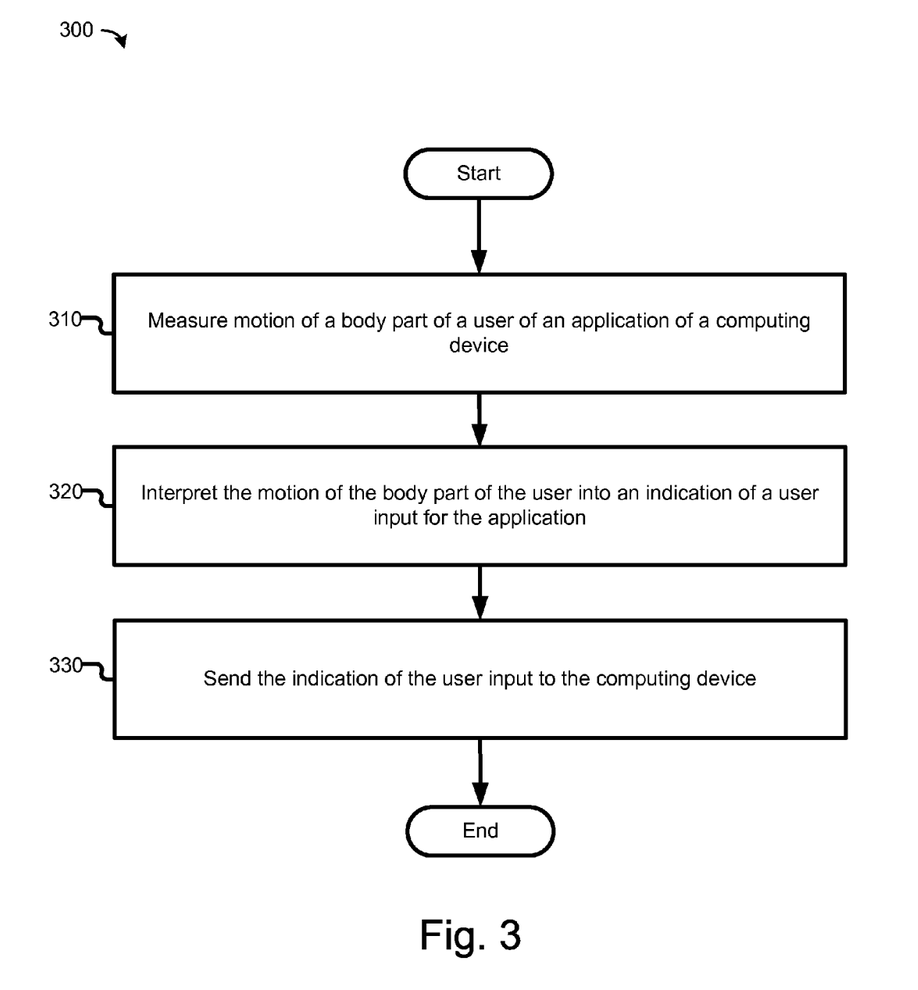
FIG. 3 is a flow diagram of an example human-computer interaction process executable by an example apparatus incorporating aspects of the present disclosure, in accordance with various embodiments.

Referring now to FIG. 3, a flow diagram of an example human-computer interaction process 300 is illustrated, in accordance with various embodiments. As shown, process 300 may be performed by wearable device 200 in FIG. 2 to implement one or more embodiments of the present disclosure.

In embodiments, the process may begin at block 310, where motion of a body part of a user of an application of a computing device may be measured, e.g., by sensor module 230 in FIG. 2. In embodiments, the computing device may be external to wearable device 200 in FIG. 2. In connection with FIG. 2, motion or gesture detection sensors, e.g., in wearable device 200, may detect motion of a body part of a user. In embodiments, wearable device 200 may actuate gesture detection sensors to further interpret various gestures made by the user. In embodiments, wearable device 200 may wake up motion or gesture detection sensors upon receiving indications of available actions from a remote device.

Next, at block 320, the motion of the body part of the user may be interpreted into an indication of a user input to the computing device or to an application of the computing device, e.g., by interpretation module 250 in FIG. 2. In embodiments, the motion of the body part of the user may be interpreted into a gesture, such as a finger gesture, a hand gesture, a body gesture, a head gesture. The gesture may be used as an indication of a user input to the computing device or to an application of the computing device.

In embodiments, wearable device 200 may directly interpret motion information to be associated with an indication of common user input in various contexts. For example, vertical movement of wearable device 200 may be interpreted as an indication of volume adjustment commands while horizontal movement of wearable device 200 may be interpreted as an indication of channel switch commands to a smart TV. In embodiments, wearable device 200 may interpret more advanced gesture information to be an indication of context-based user input. For example, a user may wear wearable device 200 on her wrist and use her hand and fingers to perform operations on an imaginary computer mouse or touch screen. For instance, during a browsing session, hand movement may be associated with operations to maneuver the imaginary computer mouse; finger tapings may be associated with different mouse clicking events; finger pinches may be associated with zooming commands; and so on. For instance, during a composing session, finger movement may be associated with text input or drawing options, and so forth.

In embodiments, a gesture may be further interpreted based on the available actions associated with the running application of the remote device. For example, a finger gesture of flexing a thumb may be interpreted as "yes" in response to a confirmation request, but "channel up" in response to a channel selection prompt. More embodiments of interpretation based on available actions are further illustrated in connection with FIG. 4.

Next, at block 330, the indication of user input may be sent, e.g., by communication module 220 in FIG. 2, to the remote device. In embodiments, communication module 220 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with a remote device. In embodiments, communication module 220 may operate in accordance with any suitable wireless communication protocols that require very low power such as Bluetooth®, ultra-wide band (UWB), and/or radio frequency identification (RFID). In embodiments, communication module 220 may also send the indication of user input to a remote device via visible light, infrared, sonic, or other wireless communication modes besides radio-based communication. In embodiments, communication module 220 may send the indication of user input to a remote server via Internet or a cellular network before the user input takes effect on the remote device. In embodiments, communication module 220 may further receive a feedback signal from the remote device in response to the user input. As an example, when the remote device accepts the user input, it may subsequently send a feedback signal to wearable device 200. Wearable device 200 may then vibrate or beep to remind the user that the user input has been successfully accepted by the remote device.

Figure 4:
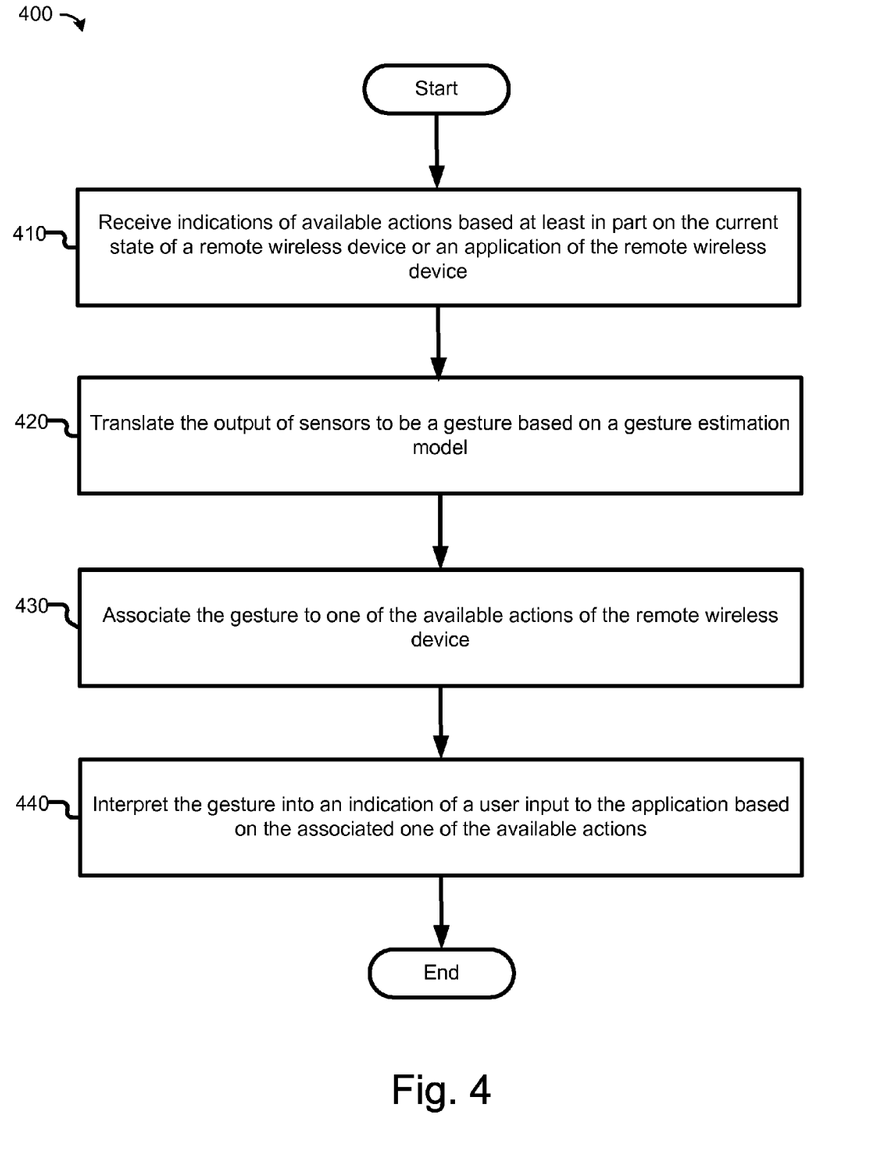
FIG. 4 is a flow diagram of an example user input interpretation process executable by an example apparatus incorporating aspects of the present disclosure, in accordance with various embodiments.

Referring now to FIG. 4, a flow diagram of an example user input interpretation process 400 is illustrated in accordance with various embodiments. As shown, process 400 may be performed by wearable device 200 in FIG. 2 to implement one or more embodiments of the present disclosure; in various embodiments, process 400 may include one or more implementations of at least a part of block 320 of process 300.

In embodiments, the process may begin at block 410, where indications of available actions based at least in part on the current state of a remote device or an application of the remote device may be received, e.g., by communication module 220 in FIG. 2. In embodiments, the remote device may be one of the content consumption devices 108 in FIG. 1. In embodiments, the remote device may be one of the content consumption device 108 in FIG. 1, such as a smart TV, a set-top box (STB) or a set-top unit (STU), a laptop, a desktop, or a server. The current state of the application may include the state of a digital logic circuit or software program currently running at the remote device, as well as all the stored data accessible to the application. For example, the current state of the application may include a user interface of the application, such as user interface engine 136 in FIG. 1.

From a user's perspective, the current state of the remote device or an application running on the remote device may be associated with some available actions at any given instant. As an example, available actions may include power on when the remote device is in a power off state. As another example, during initiation of an online 3D game, available actions may include scene selection, mission selection, team selection, role selection, skill selection, weapon selection, etc. Yet as another example, during ongoing play of the online 3D game, available actions may include pause, stop, forward, backward, volume change, angle change, perspective change, role change, etc. From the perspective of human-computer interaction, the output of the digital circuit or computer program in the remote device may be determined by its current state and user inputs.

In embodiments, indications of available actions may be received when the remote device enters a new state. For example, wearable device 200, worn by a viewer of a smart TV, may concurrently receive available actions whenever the smart TV prompts a new user interaction screen. In embodiments, indications of available actions associated with the remote device may be received before the remote device enters a particular state. For example, a set of available actions may be preloaded into, e.g., wearable device 200, based on the type of channel played on the smart TV. In embodiments, all or parts of available actions may be shown on a display of wearable device 200.

Next, at block 420, the output of sensors may be translated into a gesture based on a gesture estimation model, e.g., by sensor module 230 or interpretation module 250 in FIG. 2. In embodiments, a common gesture estimation model may be loaded into wearable device 200 based on an anticipated standard user. In embodiments, sensor module 230 may be trained to recognize a set of personalized gestures from a particular user. In embodiments, a universal set of gestures may not be feasible due to the diversity of human anatomy, habit, and environmental parameters. However, wearable device 200, enhanced with a trainable estimation model, may allow a user to customize the device with personalized gestures. Some embodiments of gesture estimation model training process are illustrated further in connection with FIG. 4. In embodiments, either sensor module 230 or interpretation module 250 may translate the output of sensors into a gesture based on a standard or trained gesture estimation model.

Next, at block 430, the gesture may be associated to one of the available actions of the remote device, e.g., by interpretation module 250 in FIG. 2. In embodiments, available actions of the remote device may be associated with a finite set of acceptable gestures. As an example, a confirmation prompt may only expect two types of actions, namely responding to the prompt or dismissing the prompt. In this instance, some gestures may be related to the action of responding while some gestures may be related to the action of dismissing. For example, gestures of thumbs-up or thumbs-down may be related to the action of responding while gestures of hand waving may be related to the action of dismissing.

Next, at block 440, the gesture may be interpreted into an indication of a user input to the application based on the associated one of the available actions, e.g., by interpretation module 250 in FIG. 2. In embodiments, once a gesture is related to a particular action, then the gesture may be interpreted as a particular user input. Continuing with the aforementioned example with the confirmation prompt, the gesture of thumbs-up may be interpreted as a confirmation from the user while the gesture of thumbs-down may be interpreted as a denial from the user. By the same token, hand waving in this context may be interpreted as the user input of "dismissing the prompt and returning to the previous screen".

Figure 5:
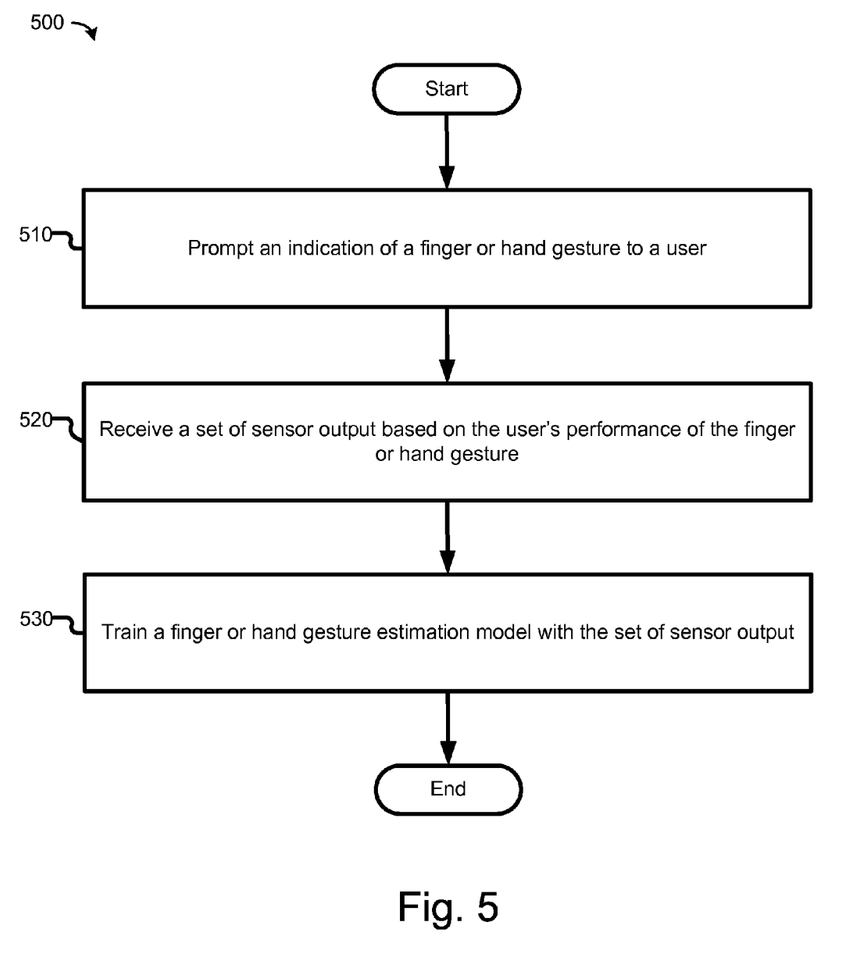
FIG. 5 is a flow diagram of an example gesture estimation model training process executable by an example apparatus incorporating aspects of the present disclosure, in accordance with various embodiments.

Referring now to FIG. 5, a flow diagram of an example gesture estimation model training process 500 is illustrated in accordance with various embodiments. As shown, process 500 may be performed by wearable device 200 to implement one or more embodiments of the present disclosure. In embodiments, the process may begin at block 510, where an indication of a finger or hand gesture may be prompted to a user, e.g., by wearable device 200. In some embodiments, such prompt may be selected from a preexisting training course of wearable device 200. In other embodiments, such prompt may be provided by the remote device based on its state. Yet in other embodiments, such prompt may be independently created by the user in order to customize wearable device 200. In embodiments, such prompt may be shown on a display of wearable device 200.

Next, at block 520, a set of sensor output based on the user's performance of the finger or hand gesture may be received, e.g., by sensor module 230 in FIG. 2. As an example, wearable device 200 may be worn around the wrist and fastened by a strap which hosts an array of piezoelectric sensors. When finger tendons are pulled, tendons may apply force to the array of piezoelectric sensors on the strap. The array of piezoelectric sensors may generate signals reflecting the change of pressure caused by such tendon movement.

Next, at block 530, a finger or hand gesture estimation model may be trained with the set of sensor output, e.g., by wearable device 200. Continuing with the aforementioned example, several different finger tendons may need to be exercised to move a finger, and different tendon movement may affect the output of those piezoelectric sensors. In embodiments, a relationship or pattern between the output of those piezoelectric sensors and finger moments may be established. This relationship or pattern may be learned by a machine learning algorithm or pattern recognition algorithm known in the art. Thus a finger gesture estimation model may be built based on such relationships or patterns. The same model may be used later to recognize finger gestures. Recognizing that the foregoing examples were merely indicative of potential gesture estimation model training process, in other embodiments, other technologies and processes may also be used by wearable device 200 to build other types of gesture estimation models.

Figure 6:
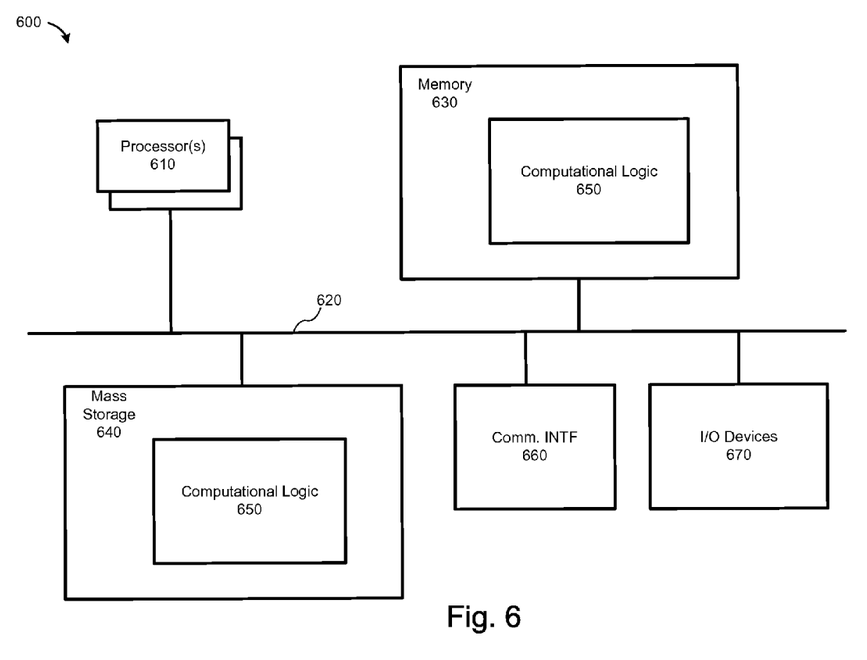
FIG. 6 illustrates an example computing environment suitable for practicing the disclosed embodiments, in accordance with various embodiments.

Referring now to FIG. 6, an example computing device suitable for use as various components to practice processes of FIGS. 3, 4, and 5 is illustrated in accordance with various embodiments. As shown, computing device 600 may include one or more processors or processor cores 610, and system memory 630. For the purpose of this application, including the claims, the terms "processor" and "processor cores" may be considered synonymous, unless the context clearly requires otherwise. Additionally, computing device 600 may include mass storage devices 640 (such as diskette, hard drive, compact disc read only memory (CD-ROM) and so forth), input/output devices 670 (such as sensors, display, keyboard, cursor control, remote control, gaming controller, image capture device, and so forth) and communication interfaces 660 (such as network interface cards, modems, infrared receivers, radio receivers (e.g., Bluetooth), and so forth). The elements may be coupled to each other via system bus 620, which may represent one or more buses. In the case of multiple buses, they may be bridged by one or more bus bridges (not shown).

Each of these elements may perform its conventional functions known in the art. In particular, system memory 630 and mass storage devices 640 may be employed to store a working copy and a permanent copy of the programming instructions implementing the operations associated with wearable device 200, e.g., operations associated with wearable computing device 200, shown in FIGS. 3-5. The various elements may be implemented by assembler instructions supported by processor(s) 610 or high-level languages, such as, for example, C or C++, which can be compiled into such instructions.

The permanent copy of the programming instructions may be placed into mass storage devices 640 in the factory, or in the field, through, for example, a distribution medium (not shown), such as a compact disc (CD), or through communication interface 660 (from a distribution server (not shown)). That is, one or more distribution media having an implementation of the agent program may be employed to distribute the agent and program various computing devices.

The number, capability and/or capacity of these elements illustrated in FIG. 6 may vary, depending on the particular implementation of computing device 600 in relationship with wearable device 200. Their constitutions are otherwise known, and accordingly will not be further described.

Figure 7:
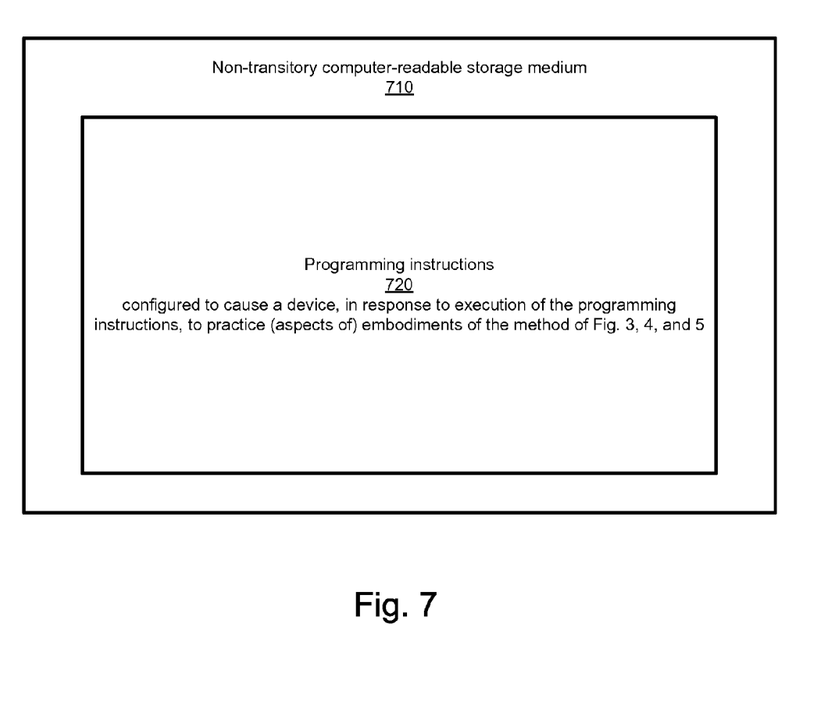
FIG. 7 illustrates an article of manufacture having programming instructions, incorporating aspects of the present disclosure, in accordance with various embodiments.

FIG. 7 illustrates an example non-transitory computer-readable storage medium having instructions configured to practice all or selected ones of the operations associated with wearable device 200, earlier described; in accordance with various embodiments. The storage medium 710 may represent a broad range of persistent storage medium known in the art, including but not limited to flash memory, dynamic random access memory, static random access memory, an optical disk, a magnetic disk, etc. As illustrated, non-transitory computer-readable storage medium 710 may include a number of programming instructions 720. Programming instructions 720 may be configured to enable a device, e.g., computing device 600, in response to execution of the programming instructions, to perform, e.g., various operations of processes 300, 400, and 500 of FIGS. 3, 4, and 5, e.g., but not limited to, to the various operations performed for human-computer interaction. In alternate embodiments, programming instructions 720 may be disposed on multiple non-transitory computer-readable storage media 710 instead.

Referring back to FIG. 6, for one embodiment, at least one of processors 610 may be packaged together with computational logic 650 configured to practice aspects of processes of FIGS. 3, 4, and/or 5. For one embodiment, at least one of processors 610 may be packaged together with computational logic 650 configured to practice aspects of processes of FIGS. 3, 4, and/or 5 to form a System in Package (SiP). For one embodiment, at least one of processors 610 may be integrated on the same die with computational logic 650 configured to practice aspects of processes of FIGS. 3, 4, and/or 5. For one embodiment, at least one of processors 610 may be packaged together with computational logic 650 configured to practice aspects of processes of FIGS. 3, 4, and/or 5. to form a System on Chip (SoC). For at least one embodiment, the SoC may be utilized in, e.g., but not limited to, a wearable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Various embodiments of the present disclosure have been described. These embodiments include, but are not limited to, those described in the following paragraphs.

Example 1 is an apparatus for human-computer interaction which may include one or more processors; a sensor module coupled to the one or more processors to measure motion of a body part of a user of an application of a computing device external to the apparatus; an interpretation module, coupled with the one or more processors and the sensor module, and configured to interpret and translate the motion of the body part of the user to an indication of a user input for the application; a communication module, coupled to the interpretation module, configured to send the indication of the user input to the computing device for the application; and a body encasing the one or more processors, the sensor module, the communication module, and the interpretation module, wherein the body has a shape or dimensions, and constituted with materials, configured for the apparatus to be worn by the user.

Example 2 may include the subject matter of Example 1, and further specifies that the user input may be associated with one or more available actions based at least in part of a current state of the application.

Example 3 may include the subject matter of Examples 1-2, and further specifies that the body part of the user may include at least one of an arm, a hand, or a finger.

Example 4 may include the subject matter of Examples 1-3, and further specifies that the communication module may include at least one of a line-of-sight wireless transmitter, an infrared transmitter, or a radio frequency transceiver.

Example 5 may include the subject matter of Examples 1-4, and further specifies that the motion may include at least one of acceleration, orientation, velocity, or positional change.

Example 6 may include the subject matter of Examples 1-5, and further specifies that the sensor module may be configured to measure a moving force applied to the body part of the user.

Example 7 may include the subject matter of Examples 1-6, and further specifies that the sensor module may be configured to measure a force generated by a finger tendon of the user.

Example 8 may include the subject matter of Examples 1-7, and further specifies that the interpretation module may be configured to interpret and translate a pattern of multiple moving forces applied to the body part of the user into the indication of the user input based at least in part on a gesture estimation model.

Example 9 may include the subject matter of Example 8, and further specifies that the multiple moving forces may be generated by multiple finger tendons of the user.

Example 10 may include the subject matter of Example 8, and further specifies that the gesture estimation model is customizable by the user.

Example 11 may include the subject matter of Examples 1-10, and further specifies that the body of the apparatus has a shape or dimensions, and constituted with materials, configured for the apparatus to be worn on a wrist of the user.

Example 12 may include the subject matter of Examples 1-11, and further specifies that the body of the apparatus has a shape or dimensions, and constituted with materials, configured for the apparatus to be worn on a neck, an arm, a leg, or a head of the user.

Example 13 is a method for human-computer interaction which may include measuring, by a wearable computing device, motion of a body part of a user of an application of a computing device external to the wearable computing device; interpreting, by the wearable computing device, the motion of the body part of the user into an indication of a user input for the application; and sending, by the wearable computing device, the indication of the user input to the computing device.

Example 14 may include the subject matter of Example 13, and may further include retrieving, by the wearable computing device, indications of a plurality of available actions from the computing device, the plurality of available actions being based at least in part on a current state of the application.

Example 15 may include the subject matter of Example 14, and further specifies that the interpretation may be based at least in part on the plurality of available actions.

Example 16 may include the subject matter of Examples 13-15, and further specifies that the current state of the computing device may include a user interface of the application.

Example 17 may include the subject matter of Examples 13-16, and may further include receiving, by the wearable computing device, a feedback signal from the computing device in response to receiving the indication of the user input.

Example 18 may include the subject matter of Examples 13-17, and further specifies that the measuring may include measuring a moving force applied to the body part of the user.

Example 19 may include the subject matter of Examples 13-18, and further specifies that the measuring may include measuring a force applied by a finger tendon of the user.

Example 20 may include the subject matter of Examples 13-19, and further specifies that the interpreting may include translating a pattern of a plurality of moving forces applied to the body part of the user into the indication of the user input based at least in part on a gesture estimation model.

Example 21 may include the subject matter of Example 20, and further specifies that the gesture estimation model may be customizable by the user.

Example 22 may include the subject matter of Example 20, and further specifies that the plurality of moving forces may be generated by a plurality of finger tendons.

Example 23 is one or more storage medium having stored therein instructions configured to cause a device, in response to execution of the instructions by the device, to practice any one of the methods of 13-22.

Example 24 is an apparatus for human-computer interaction which may include means to practice any one of the method of 13-22.

What is claimed is:

1. A wearable apparatus for human-computer interaction, comprising:
   one or more processors;
   a sensor module coupled to the one or more processors to measure a motion of a body part of a user, wherein the user is interacting with an application of a computing device external to the apparatus;
   an interpretation module, coupled with the one or more processors and the sensor module, and configured to:
   interpret the motion of the body part of the user;
   receive an indication of available actions based on a current state of the computing device or the application, wherein the indication of the available actions is received when the wearable apparatus enters a new state based on the current state of the computing device or the application prompting a new user interaction screen;
   output the available actions for display on a display of the wearable apparatus;
   associate the interpreted motion with an available action of the available actions; and
   translate, using a trained gesture estimation model, the motion of the body part into an indication of a user input for the application based on the associated available action;
   a communication module, coupled to the interpretation module, configured to:
   send the indication of the user input to the computing device for the application, and
   receive a feedback signal from the computing device notifying the user that the user input has been successfully accepted by the computing device; and
   a body encasing the one or more processors, the sensor module, the communication module, and the interpretation module, wherein the body is configured for the apparatus to be worn by the user.

2. The wearable apparatus according to claim 1, wherein the body part of the user comprises at least one of an arm, a hand, or a finger.

3. The wearable apparatus according to claim 1, wherein the communication module comprises at least one of a line-of-sight wireless transmitter, an infrared transmitter, or a radio frequency transmitter.

4. The wearable apparatus according to claim 1, wherein the motion comprises at least one of acceleration, orientation, velocity, or positional change.

5. The wearable apparatus according to claim 1, wherein the sensor module is configured to measure a moving force applied to the body part of the user.

6. The wearable apparatus according to claim 1, wherein the sensor module is configured to measure a force generated by a finger tendon of the user.

7. The wearable apparatus according to claim 1, wherein the interpretation module is configured to interpret and translate a pattern of a plurality of moving forces applied to the body part of the user into the indication of the user input based at least in part on the trained gesture estimation model.

8. The wearable apparatus according to claim 7, wherein the plurality of moving forces are generated by a plurality of finger tendons of the user.

9. The wearable apparatus according to claim 7, wherein the trained gesture estimation model is customizable by the user.

10. The wearable apparatus according to claim 1, wherein the body is configured for the apparatus to be worn on a wrist, a neck, an arm, a leg, or a head of the user.

11. A method for human-computer interaction, comprising:
    measuring, by a wearable computing device, motion of a body part of a user, wherein the user is interacting with an application of a computing device external to the wearable computing device;
    receiving, at the wearable computing device, an indication of available actions based on a current state of the computing device or the application, wherein the indication of the available actions is received when the wearable computing device enters a new state based on the current state of the computing device or the application prompting a new user interaction screen;
    displaying, by the wearable computing device, the available actions;
    associating, by the wearable computing device, the measured motion with an available action of the available actions;
    interpreting, by the wearable computing device, using a trained gesture estimation model, the motion of the body part of the user into an indication of a user input for the application based on the associated available action;
    sending, by the wearable computing device, the indication of the user input to the computing device; and
    receiving, by the wearable computing device, a feedback signal from the computing device notifying the user that the user input has been successfully accepted by the computing device.

12. The method according to claim 11, further comprising:
    retrieving, by the wearable computing device, indications of the available actions from the computing device.

13. The method according to claim 11, wherein the measuring comprises at least one of measuring a moving force applied to the body part of the user, or measuring a force applied by a finger tendon of the user.

14. The method according to claim 11, wherein the interpreting comprises translating a pattern of a plurality of moving forces applied to the body part of the user into the indication of the user input based at least in part on a gesture estimation model.

15. The method according to claim 14, wherein the plurality of moving forces are generated by a plurality of finger tendons.

16. At least one non-transitory computer-readable storage medium, comprising a plurality of instructions, which when executed by at least one processor of a wearable computing device, cause the at least one processor to:
    measure motion of a body part of a user, wherein the user is interacting with an application of a computing device external to the wearable computing device;

receive an indication of available actions based on a current state of the computing device or the application, wherein the indication of the available actions is received when the wearable computing device enters a new state based on the current state of the computing device or the application prompting a new user interaction screen;

output the available actions for display on a display of the wearable computing device;

associate the measured motion with an available action of the available actions;

interpret, using a trained gesture estimation model, the motion of the body part of the user into an indication of a user input for the application based on the associated available action;

send the indication of the user input to the computing device; and receive, from the computing device, a feedback signal notifying the user that the user input has been successfully accepted by the computing device.

17. The at least one non-transitory computer-readable storage medium of claim 16, wherein the plurality of instructions further cause the at least one processor to:

retrieve indications of the available actions from the computing device.

18. The at least one non-transitory computer-readable storage medium of claim 16, wherein the plurality of instructions further cause the at least one processor to:

receive a feedback signal from the computing device in response to receiving the indication of the user input.

19. The at least one non-transitory computer-readable storage medium of claim 16, wherein the plurality of instructions that cause the at least one processor to measure the motion of the body part further comprise a plurality of instructions that cause the at least one processor to measure a moving force applied to the body part of the user or measure a force applied by a finger tendon of the user.

20. The at least one non-transitory computer-readable storage medium of claim 16, wherein the plurality of instructions that cause the at least one processor to interpret the motion comprise a plurality of instructions that cause the at least one processor to translate a pattern of a plurality of moving forces applied to the body part of the user into the indication of the user input based at least in part on the trained gesture estimation model.

* * * * *